United States Patent
Gaynor et al.

(10) Patent No.: US 7,143,363 B1
(45) Date of Patent: Nov. 28, 2006

(54) METHOD FOR DISPLAYING MARINE VESSEL INFORMATION FOR AN OPERATOR

(75) Inventors: Phillip K. Gaynor, Fond du Lac, WI (US); Kurt D. Willows, West Bend, WI (US)

(73) Assignee: Brunswick Corporation, Lake Forest, IL (US)

( * ) Notice: Subject to any disclaimer, the term of this patent is extended or adjusted under 35 U.S.C. 154(b) by 670 days.

(21) Appl. No.: 10/205,037

(22) Filed: Jul. 25, 2002

(51) Int. Cl.
*G06F 3/00* (2006.01)
*G06F 3/14* (2006.01)
*G06F 7/00* (2006.01)
*G06F 15/177* (2006.01)

(52) U.S. Cl. .................... 715/771; 715/744; 715/835; 715/846; 715/961; 701/200; 702/183; 440/84; 340/461; 340/984

(58) Field of Classification Search ............ 715/700, 715/746, 747, 764, 765, 810, 835, 846, 866, 715/961, 744, 771; 701/200; 702/183; 440/84; 340/461, 984
See application file for complete search history.

(56) References Cited

U.S. PATENT DOCUMENTS

| | | | | |
|---|---|---|---|---|
| 4,843,575 A * | 6/1989 | Crane | ........................... | 701/99 |
| 4,988,996 A | 1/1991 | Ito | ........................... | 340/984 |
| 5,063,381 A | 11/1991 | Ito | ........................... | 340/984 |
| 5,452,216 A * | 9/1995 | Mounce | ...................... | 701/214 |
| 5,523,951 A * | 6/1996 | Kriesgman et al. | ........... | 701/21 |
| 5,691,695 A | 11/1997 | Lahiff | ......................... | 340/461 |
| 5,745,114 A * | 4/1998 | King et al. | ................. | 715/810 |
| 5,818,428 A * | 10/1998 | Eisenbrandt et al. | ........ | 345/173 |
| 6,151,133 A | 11/2000 | Sakauchi et al. | ............... | 358/1 |
| 6,154,703 A | 11/2000 | Nakai et al. | ................. | 701/200 |
| 6,157,297 A | 12/2000 | Nakai | ......................... | 340/461 |
| 6,212,483 B1 | 4/2001 | Carew et al. | ............... | 702/183 |
| 6,271,841 B1 | 8/2001 | Tsujimoto | .................... | 345/349 |
| 6,273,771 B1 * | 8/2001 | Buckley et al. | ............... | 440/84 |
| 6,280,269 B1 | 8/2001 | Gaynor | ........................ | 440/84 |
| 6,308,649 B1 * | 10/2001 | Gedeon | .................... | 114/39.11 |
| 6,317,387 B1 * | 11/2001 | D'Amaddio et al. | ......... | 367/129 |
| 6,377,283 B1 * | 4/2002 | Thomas | ...................... | 715/762 |
| 6,393,347 B1 * | 5/2002 | Snyder et al. | ................. | 701/35 |
| 6,592,412 B1 * | 7/2003 | Geil et al. | ..................... | 440/6 |
| 6,611,737 B1 * | 8/2003 | El-Tahan et al. | ............... | 701/21 |
| 6,734,808 B1 * | 5/2004 | Michaelson et al. | ......... | 340/984 |
| 6,841,059 B1 * | 1/2005 | Staerzl | ........................ | 205/727 |
| 6,847,916 B1 * | 1/2005 | Ying | ........................... | 702/183 |
| 2003/0093187 A1 * | 5/2003 | Walker | | |
| 2003/0191562 A1 * | 10/2003 | Robertson et al. | | |
| 2003/0206102 A1 * | 11/2003 | Joao | | |
| 2004/0059477 A1 * | 3/2004 | Kish et al. | ..................... | 701/21 |
| 2004/0090195 A1 * | 5/2004 | Motsenbocker | | |
| 2005/0283285 A1 * | 12/2005 | Ying | | |

\* cited by examiner

*Primary Examiner*—Lucila X. Bautista
(74) *Attorney, Agent, or Firm*—William D. Lanyi

(57) ABSTRACT

A method for displaying marine vessel information automatically selects a chosen visual display based on the magnitudes of one or more vessel-related parameters, such as engine speed, gear selector position, or vessel velocity. Based on the selected marine vessel operating condition, the chosen visual display is selected and the contents of that chosen visual display are presented on an information display device, such as a liquid crystal display or other type of monitor. As the marine vessel changes its operating condition, the process is repeated so that the marine vessel operator always is presented with the most appropriate screen images relating to the marine vessel at its current operating condition.

20 Claims, 14 Drawing Sheets

METHOD FOR DISPLAYING MARINE VESSEL INFORMATION FOR AN OPERATOR

BACKGROUND OF THE INVENTION

1. Field of the Invention

The present invention is generally related to an information display system for a marine vessel and, more particularly, to a method for displaying information to the operator of a marine vessel in which the current operating condition of the vessel is used to determine which visual image or combination of visual images are displayed.

2. Description of the Prior Art

Vast amounts of information are displayed in numerous ways to convey that information to human beings who are operating equipment. The information can be printed on paper, represented on gauges and meters, or displayed on monitors which can be liquid crystal displays (LCD's). Typically, the type of data displayed for an operator of a machine is predetermined when the display system is originally designed or, in certain applications, it can be changed by the operator of the machine. Manually changeable systems typically allow the operator of the machine to make a selection that determines the information displayed.

U.S. Pat. No. 6,271,841, which issued to Tsujimoto on Aug. 7, 2001, describes an information processor for changing a display in response to an input audio signal. In a situation where a moving picture, representing a person playing the piano, is being displayed on a screen responsive to an animation signal, while a human voice reporting an item of news is being output responsive to an audio signal with a caption displayed on the screen as an icon image, a comparator continuously compares information contained in a spoken phrase that is contained in the voice with another information like a word prescribed by an operator. The moment a correspondence is found between these pieces of information, the caption, which has been displayed as an icon image, is turned into a window. In this manner, information contained in an audio signal is always monitored and when a predetermined condition is met, an icon image is changed into a window automatically and timely. Accordingly, an operator need not perform a troublesome operation of manually changing an icon image into a window.

U.S. Pat. No. 6,212,483, which issued to Carew et al on Apr. 3, 2002, describes an apparatus and method of providing diagnostic information to an operator. The invention relates to an apparatus and method of providing diagnostic information to an operator of work machine. Whether the work machine control system is in diagnostic message mode is determined. At least one diagnostic fault parameter descriptive message is read from a memory. The diagnostic fault parameter descriptive message is provided to the operator. Preferably, diagnostic messaging is determined by whether the work machine control system is in service mode and whether the diagnostic text function is selected. Advantageously, a component identification number descriptive message is provided in a first character display and a failure mode indicating number descriptive message is provided in a second character display of an operator interface.

U.S. Pat. No. 6,157,297, which issued to Nakai on Dec. 5, 2000, describes a display for vehicle navigational systems. The system is particularly adapted for use with small open vehicles such as a motorcycle. The navigational system includes a display which displays, in addition to vehicle speed and distance traveled, navigational information as to points along a preselected course of travel and the distance and turning direction to reach each successive point. The operator may also insert information about each point, such as observations about the point as the name of the point. The display switches from providing a first display condition that provides the travel information and a second condition that permits the insertion of data into the system. The insertion display is not enabled unless the vehicle is in a standing condition and is automatically returned to display operating conditions when the vehicle again moves.

U.S. Pat. No. 6,154,703, which issued to Nakai et al on Nov. 28, 2000, describes control for vehicle navigational system. The system is adapted for use with small open vehicles, such as a motorcycle. The system includes a display which displays, in addition to vehicle speed and distance traveled, navigational information as to points along a preselected course of travel and the distance and turning direction to reach each successive point. The operator may also insert information about each point, such as observations about the point as the name of the point. The display switches from providing a first display condition that provides the travel information and a second condition that permits the insertion of data into the system. The insertion display is not enabled unless the vehicle is in a standing condition.

U.S. Pat. No. 6,151,133, which issued to Sakauchi et al on Nov. 21, 2000, describes a data communication apparatus having a display device, on which several types of information is sequentially displayed and a printing device. A facsimile apparatus according to the invention has a display device and a printing device, the display device sequentially displays several types of information, for example, a condition of the apparatus, a condition of storing an image transmission, a result of a facsimile communication, etc., in response to each manual instruction by an operator. If the operator inputs a manual instruction for printing, the apparatus causes the printing device to print out a report relating to the information to be displayed by the display device so that the operator quickly knows that several kinds of information by watching the printing report without inputting each manual instruction.

U.S. Pat. No. 5,691,695, which issued to Lahiff on Nov. 25, 1997, describes a vehicle information display on a steering wheel surface. The steering wheel is provided with a thin reconfigurable display such as an LED, an LCD, an electro-luminescent display, or other types of reconfigurable thin displays. Vehicle instrument information such as speedometer, fuel level, vehicle temperature, engine speed, etc. are provided on this display. The reconfigurable display is provided with a control that reconfigures the location of the information on the display. The control is provided with a signal indicative of rotation of the steering wheel and the control takes that signal and adjusts the information such that the display information maintains a particular orientation relative to the horizontal during a turn. With the present invention, the vehicle operator need only consult the vehicle steering wheel to obtain information about the vehicle condition. There are thus less constraints on the design of the steering wheel, and in the requirement of providing visual access to the instrument panel.

U.S. Pat. No. 5,063,381, which issued to Ito on Nov. 5, 1991, describes a vessel running information display control system. The system that is operative to provide a display both of vehicle operating conditions and extraneous operating conditions. A switching arrangement allows the operator to select either the display of the external condition except during initial operation and when there is an abnormal condition in which case the vehicle running condition is displayed or a condition wherein the vehicle running condition is continuously displayed.

U.S. Pat. No. 4,988,996, which issued to Ito on Jan. 29, 1991, describes a display system. The system in a marine vessel or other vehicle which includes various means or sensors for detecting various operating and navigating conditions of the vessel or vehicle and a single displaying device for displaying information regarding one or more of the conditions is described. When the display system is used in a marine vessel, the system also includes a fish detection sensor and information regarding the detection of fish is displayed on the single displaying device. The single displaying device has a fixed display which displays information regarding particular operating and navigating conditions and a variable display. The variable display has three displays: a first display of information, a second display of information, and a warning display of warning information. The first and second displays can be displayed alternatively by the operator. The warning display of warning information regarding at least one of the various operating and navigating conditions is displayed automatically when that particular condition is detected to be outside of its predetermined range.

U.S. Pat. No. 6,280,269, which issued to Gaynor on Aug. 28, 2001, discloses an operator display panel control system by throttle mechanism switch manipulation. A throttle control mechanism is provided with a plurality of buttons and a control unit that interprets the state of the various buttons and switches in different ways, depending on the state of the first operating parameter. The first operating parameter can be the gear selector position or the status of a manual selector switch or push button. Based on the state of the first operating parameter, at least one switch is interpreted to represent a first command based on a first state of the first operating parameter and second command based on the second state of the first operating parameter. This allows dual functionality for the buttons and switches which reduces the required number of switches and also allows the important control switches to be placed easily within reach of the operator of a marine vessel.

The patents described above are hereby expressly incorporated by reference in the description of the present invention.

SUMMARY OF THE INVENTION

A method for displaying marine vessel information, in a preferred embodiment of the present invention, comprises the steps of measuring a magnitude of each of a plurality of parameters relating to the marine vessel and defining a plurality of potential operating conditions of the marine vessel. It also comprises the steps of selecting a current operating condition of the marine vessel, from the plurality of potential operating conditions of the marine vessel, as a function of one or more of the magnitudes of the plurality of parameters relating to the marine vessel. The present invention, in a preferred embodiment, also comprises the steps of providing an information display device and a plurality of visual images from which a chosen visual display can be selected for display on an information display system, such as the screen of a monitor. Each of the plurality of visual images comprises a measured magnitude of one or more of the plurality of parameters relating to the marine vessel. An additional step in a preferred embodiment of the present invention is the selecting of the chosen visual display from the plurality of visual images as a function of the current operating condition and, in addition, the step of causing said chosen visual display to be displayed on the information display device.

The chosen visual display can comprise more than one of the plurality of visual images in a preferred embodiment of the present invention and the more than one of the plurality of visual images of the chosen visual display can be sequentially displayed on the information display device. Each of the more than one of the plurality of visual images of the chosen visual display is displayed for a time period which can be manually selected by the operator of the marine vessel.

An additional step of the preferred embodiment of the present invention can be the receiving of a preferred set of the plurality of visual images to be selected as the chosen visual display for each of the plurality of preselected vessel operating conditions. This preferred set of visual images can be provided as a manual input resulting from the action of the operator of the marine vessel.

The plurality of parameters relating to the marine vessel can be selected from the group consisting of engine speed, marine vessel velocity, engine temperature, water pressure, battery charge level, fuel flow rate, oil pressure, propeller trim angle, steering position, quantity of fuel in the fuel tank, quantity of waste in a waste tank, direction of travel of the marine vessel, relative global position of the marine vessel, and a preselected position, water depth, water temperature, and trim tab position. The current operating condition of the marine vessel can be selected from the group consisting of idle engine speed and neutral gear selection, idle engine speed in forward or reverse gear, a gear selection other than neutral and a rate of change of engine speed greater than a preselected magnitude in a positive direction between idle and a preselected engine speed, engine speed greater than the preselected engine speed, marine vessel velocity within a preselected range of magnitudes, and an engine speed within a predetermined range of maximum engine speed.

The information display device can be a liquid crystal device or any other suitable component that allows data to be displayed visually for the operator of a marine vessel.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
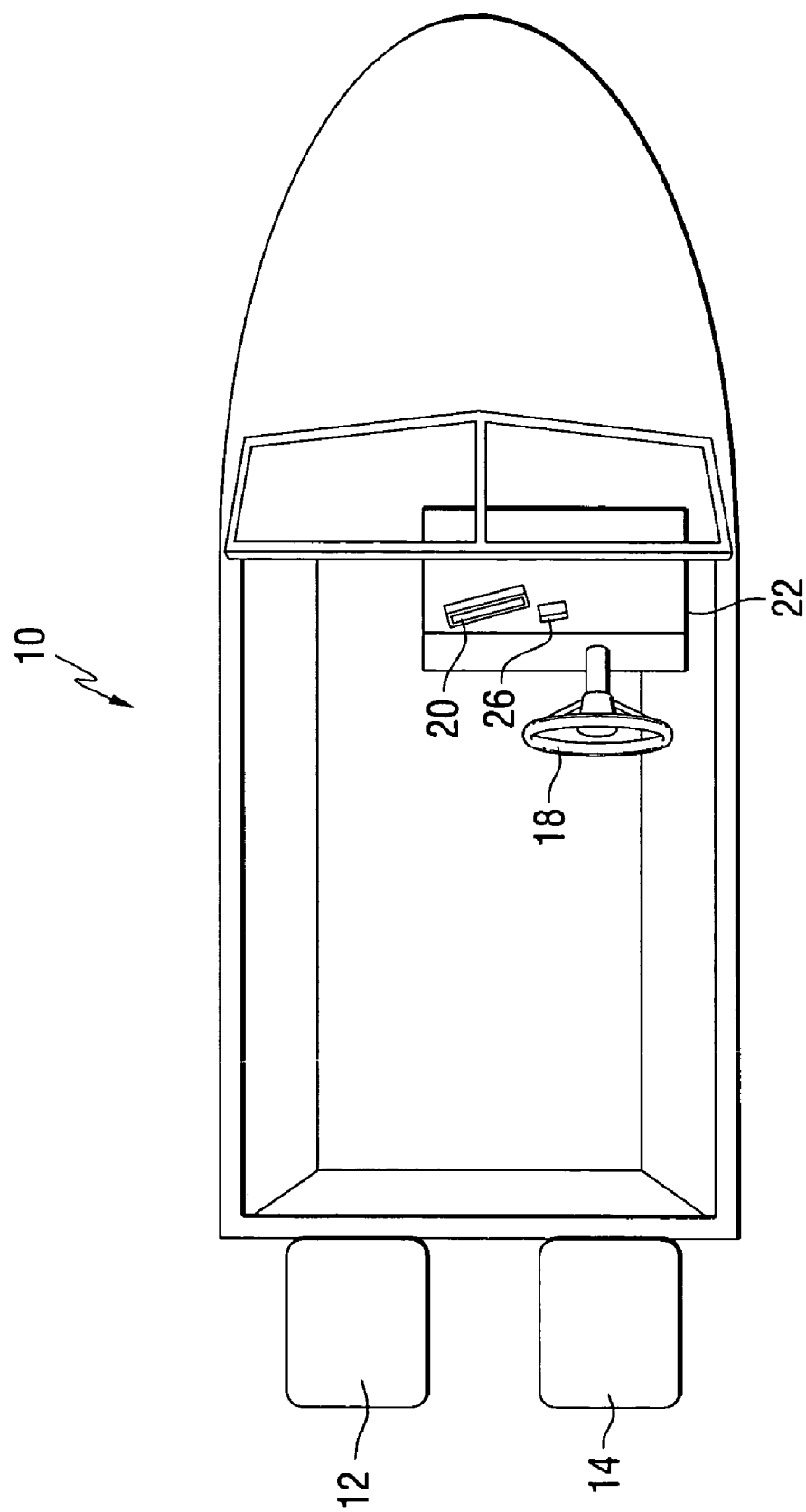
FIG. 1 is a simplified representation of a marine vessel incorporating the present invention.

Throughout the description of the preferred embodiment of the present invention, like components will be identified by like reference numerals.

FIG. 1 is a highly simplified representation of a marine vessel 10 which is powered by two outboard motors, 12 and 14. The marine vessel 10 shown in FIG. 1 is provided with a helm at which an operator can control the operation of the vessel. At the helm, a steering wheel 18 is provided, along with an information display device 20 which can comprise a monitor screen. The helm console 22 can also house or support other instrumentation, such as a global position sensor (GPS) 26, a microprocessor, and other components relating to instrumentation provided for sensing various parameters relating to the marine vessel 10. It should be understood that the marine propulsion units, 12 and 14, also comprise microprocessors for use as engine control units (ECU's) and those microprocessors are also suitable for use in implementing the functions of the present invention which will be described in greater detail below.

Figure 2:
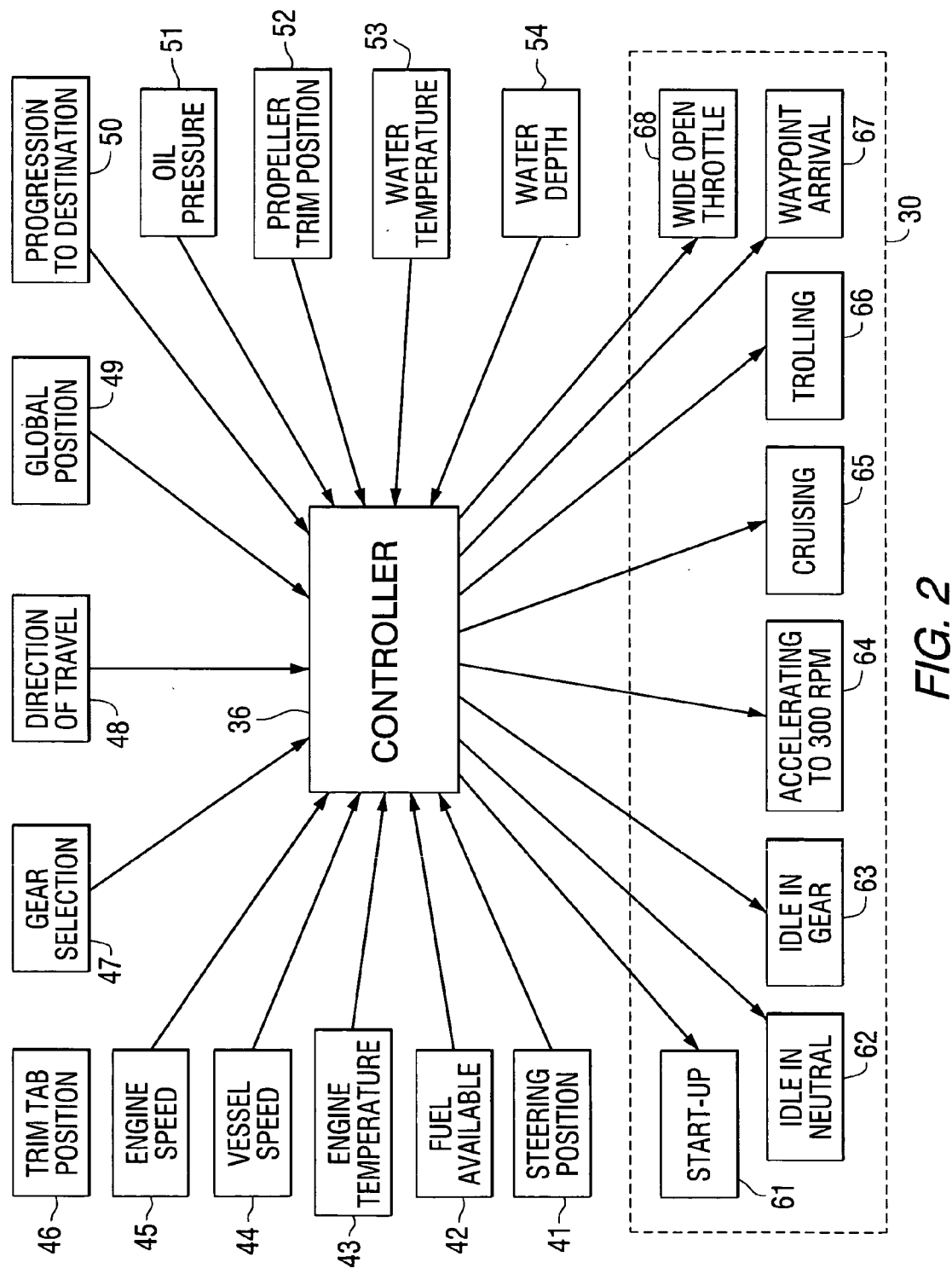
FIG. 2 is a graphical representation of a controller, a plurality of parameters, and a plurality of potential marine vessel operating conditions from which a current operating condition is selected.

FIG. 2 is a schematic representation of a plurality of parameters provided as inputs to a controller 36, such as the microprocessor described above, and a plurality of potential operating conditions 30 from which a current operating condition can be selected by the controller 36.

In FIG. 2, the plurality of parameters, 41–54, are various parameters relating to the marine vessel that can be sensed, by appropriate sensors, and information provided by those sensors is received by the controller 36. The steering position 41, which represents the relative angular position of the marine propulsion system to the transom of the marine vessel 10 can be determined in several ways which include a rotational position sensor or a linear sensor associated with the steering axis of the marine propulsion system, which can comprise one or more outboard motors, 12 and 14. The available fuel 42 can easily be determined by a depth sensor associated with the fuel tank. The engine temperature 43 can be sensed by a thermocouple or alternative temperature sensor associated with the cooling system of the engine. Vessel speed 44 is typically measured by an appropriate speedometer which can be of the paddle-wheel type, pitot tube type, or a global position sensor (GPS). Engine speed 45 is typically sensed by a tachometer and trim tab position 46 can be sensed either by a rotational position sensor associated with the axis of the trim tabs or a linear sensor associated with a cylinder used to move the trim tabs. The gear selector 47 can be determined by a sensor associated with the manual throttle handle that is used by the operator of a marine vessel to select a gear position of forward, reverse, or neutral. The direction of travel 48 can be determined by a global position sensor (GPS) or a compass-like device. Global position 49 is typically determined through the use of a global position sensor (GPS). Progression to destination 50 can typically be determined through the use of a global position sensor (GPS). Oil pressure 51 is sensed by a pressure transducer associated with the lubrication system of the engine. Propeller trim position 52 can be determined through the use of a rotational position sensor associated with the trim axis of an outboard motor or drive unit of a sterndrive system. The water temperature 53 can be measured by a thermocouple and the water depth 54 can easily be determined through the use of any of several well known depth finders. As an example, but not limiting to the present invention, a sonic depth finder can be connected to the engine controller. Each of the plurality of parameters, 41–54, are measured by appropriate sensors and the information is transmitted to the controller 36 for later use by the present invention. In addition, although not explicitly illustrated in FIG. 2, sensors could be provided to determine vessel attitude (e.g. pitch, roll, yaw), fuel tank range, and oil tank range. Other parameters can also be sensed and shown in visual images. For example, generator information, trim tab status, AC/DC status, air conditioning information, or transmission status can be measured and illustrated.

The present invention also comprises the step of defining a plurality of potential operation conditions of the marine vessel. These potential operating conditions 30 are shown at the bottom portion of FIG. 2. They include a start-up condition 61 that immediately follows the activation of a start switch or ignition key by the operator. A second potential operating condition, idle in neutral 62, is when the engine of the marine vessel is running at idle speed and the gear selection system is in neutral gear position. The idle in gear 63 operating condition is when the engine of the marine vessel is operating at idle speed, but the gear selector is in either the forward or reverse gear position. The potential operating condition identified by reference numeral 64 describes the circumstance when the engine of the marine vessel is accelerating within a predefined range, such as 0 to 3000 RPM. The potential operating condition of cruising 65 describes a situation in which the marine vessel is operating at cruising speed, which is defined as a preselected velocity range, and the velocity is generally constant. The trolling 66 operating condition is typically related to the use of certain engine control algorithms that maintain the engine speed at a relatively low and constant magnitude. The way point arrival operating condition relates to the arrival of the marine vessel at a particular global position during a journey. The wide open throttle (WOT) 68 operating condition is defined as being when the marine vessel is operating at its maximum engine speed. The controller 36 selects from the plurality of potential operating conditions, 61–68, as a function of the magnitudes of selected ones of the plurality of parameters, 41–54, shown in FIG. 2 or additional sensors for determining other variables such as vessel attitude, fuel tank range, or oil tank range. Most typically, the current operating condition of the marine vessel is selected from the potential operating conditions, 61–68, based on the engine speed 45, gear selection 47, and vessel speed 44.

Figure 3:
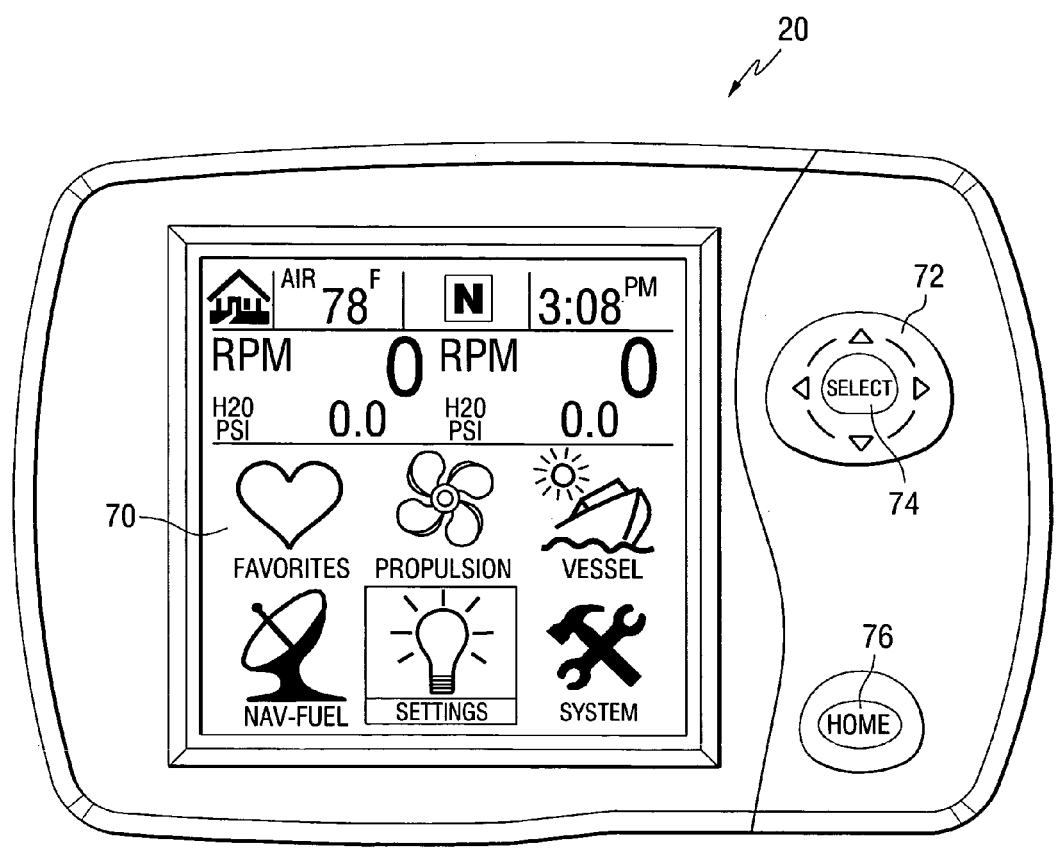
FIG. 3 shows a display device with a home page illustrated on its screen.

FIG. 3 illustrates an information display device 20 such as the one described above in conjunction with FIG. 1. It comprises a display screen region 70 that can be an LCD display. It also provides an arrow track pad control 72 that allows the marine vessel operator to move a highlighted segment up, down, and side-to-side. A centrally positioned select key 74 is used to select screen portions that are highlighted and to confirm certain data entry operations. The home key 76 returns the display to the home page and allows the operator to turn the system view on or off if a main key switch is not utilized.

When the operator of the marine vessel is manually controlling the information display device 20, several different categories of information can be requested. These are identified symbolically on the home page screen which is illustrated in FIG. 3. As an example, the "NAV-FUEL" group of displays includes the direction to a target way point, present course of the marine vessel, current velocity, distance, time, speed, and fuel to next way point, a trip history display, water depth and history, and seawater temperature. The "PROPULSION" group of displays includes engine speed, engine trim synchronizer, maximum boat speed, maximum engine speed, engine temperature, engine water temperature, fuel consumption, propulsion information, and vessel information. The "VESSEL" group of displays includes steering angle, fuel tank, water tank, waste tank, sterndrive or outboard motor trim, and engine operating hours. The "FAVORITES" icon in FIG. 3 allows the operator to select a preferred group of information displays. The "SETTINGS" icon and the "SYSTEM" icon allow the marine vessel operator to select various vessel operating functions which are not directly related to the present invention.

In order to more fully understand the operation of the present invention, it is helpful to know the various types of individual visual images that can be implemented, alone or in combination with other visual images, by the present invention. FIGS. 4–22 illustrate the plurality of visual images provided by the present invention from which a chosen visual display can be selected for display on the information display device 20. It should be understood that the chosen visual display can comprise one or more of the plurality of visual images shown in FIGS. 4–22. In the individual descriptions of FIGS. 4–22, below, references will be made to the various parameters illustrated in FIG. 2.

Figure 4:
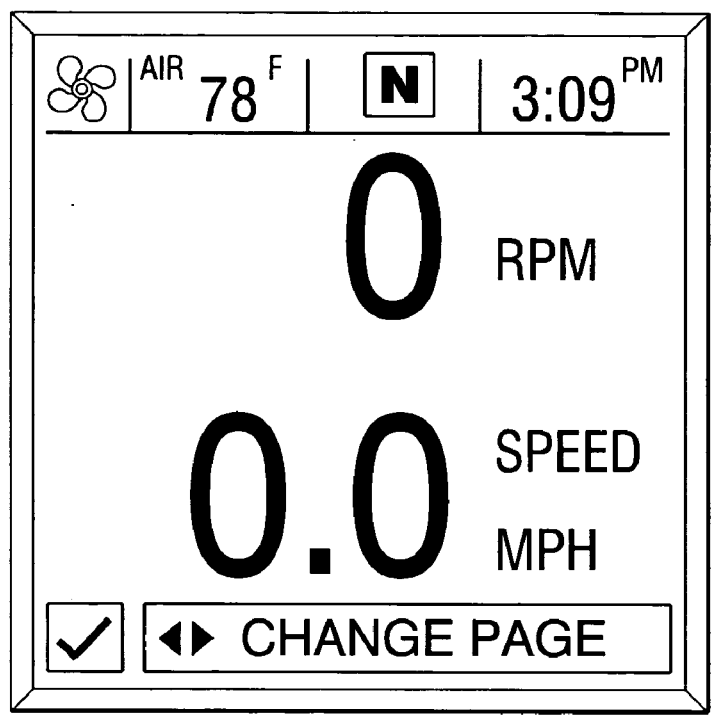
FIGS. 4–22 show various alternative visual images that can be selected by the present invention.

FIG. 4 shows the engine RPM and speed visual image. In this particular visual image, the most recent measured magnitude of the engine speed 45 and vessel speed 44 are contained within the image.

Figure 5:
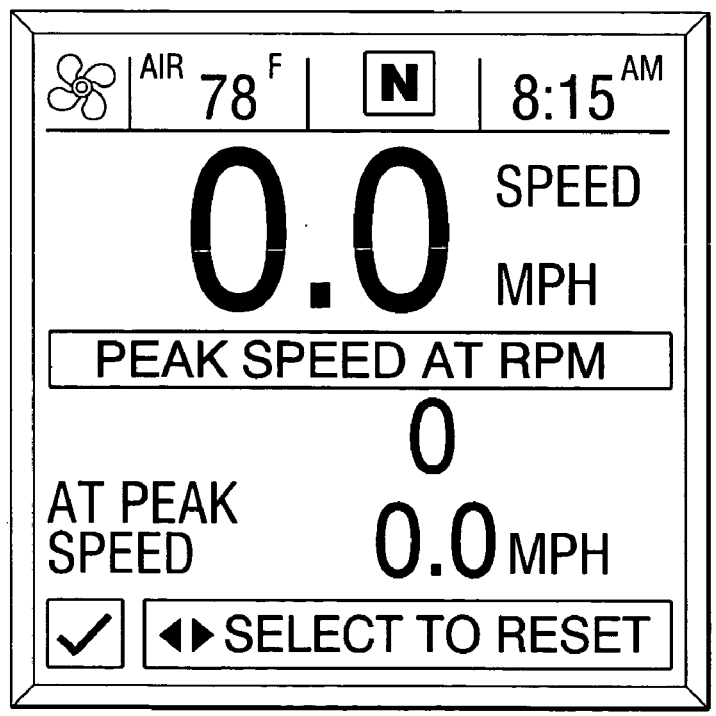

FIG. 5 shows the peak speed at RPM. This particular visual image records the maximum velocity of the marine vessel that was reached since the data was last cleared. It also shows the associated engine speed as measured since the last time that the system was manually reset.

Figure 6:
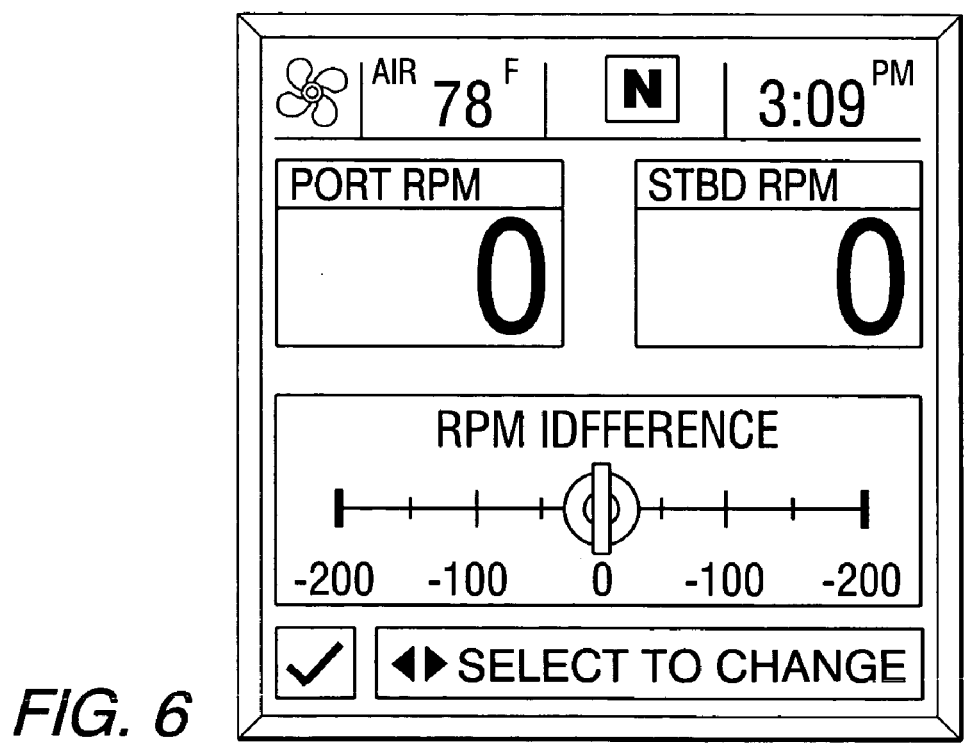

FIG. 6 is a visual image that can be used when the marine vessel 10 has two marine propulsion systems, such as the two outboard motors, 12 and 14, illustrated in FIG. 1. When the marine vessel 10 has twin engines, the visual image shown in FIG. 6 displays the difference in engine speed between the port and starboard engines.

Figure 7:
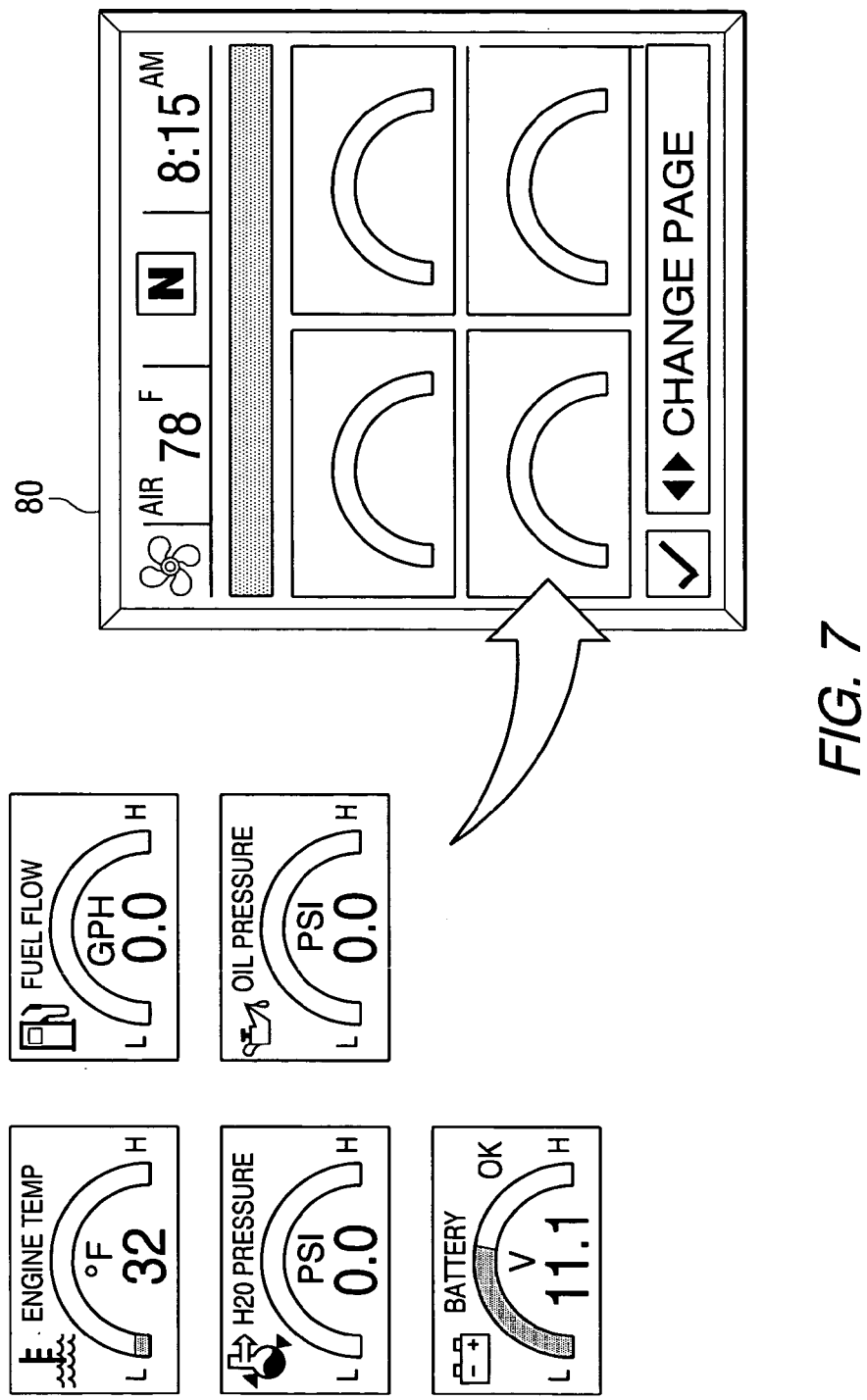

FIG. 7 shows the engine data visual image which can be a single image 80 that contains four different gauge-like representations selected from the options shown in the left half of FIG. 7. These gauge-like representations can include engine temperature, water pressure, battery level, fuel flow, and oil pressure.

Figure 8:
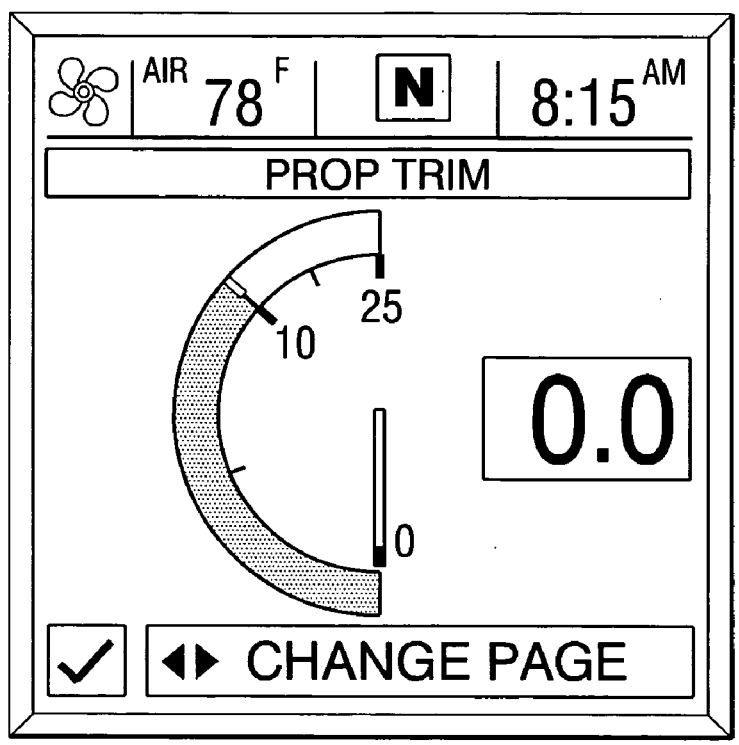

FIG. 8 shows the trim position of the propeller relative to the transom of the marine vessel. The trim position, as achieved by setting the trim and trailer position of the propulsion unit, is represented graphically in this visual image.

Figure 9:
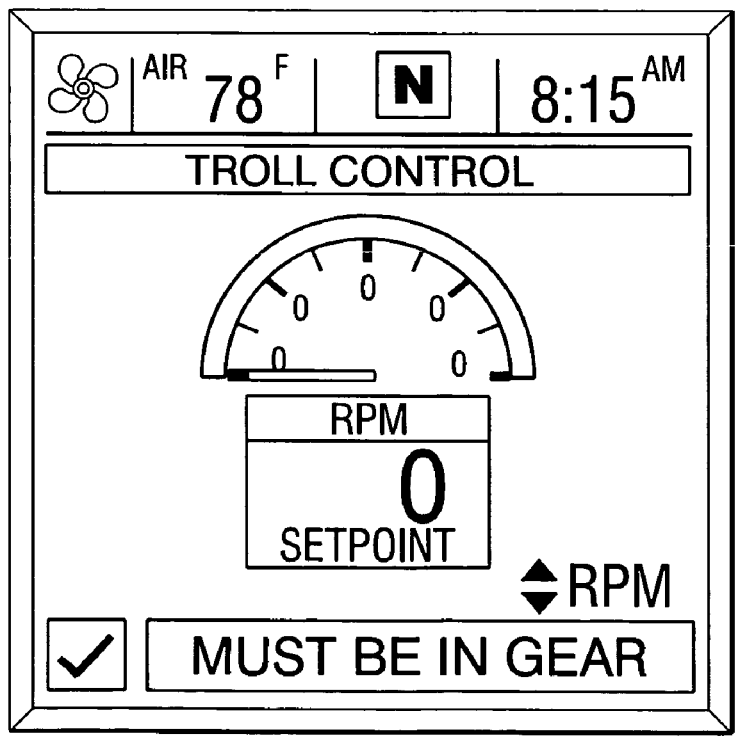

FIG. 9 is a visual image that illustrates the engine speed during a trolling maneuver, particularly when under an automatic algorithm to control the engine during trolling.

Figure 10:
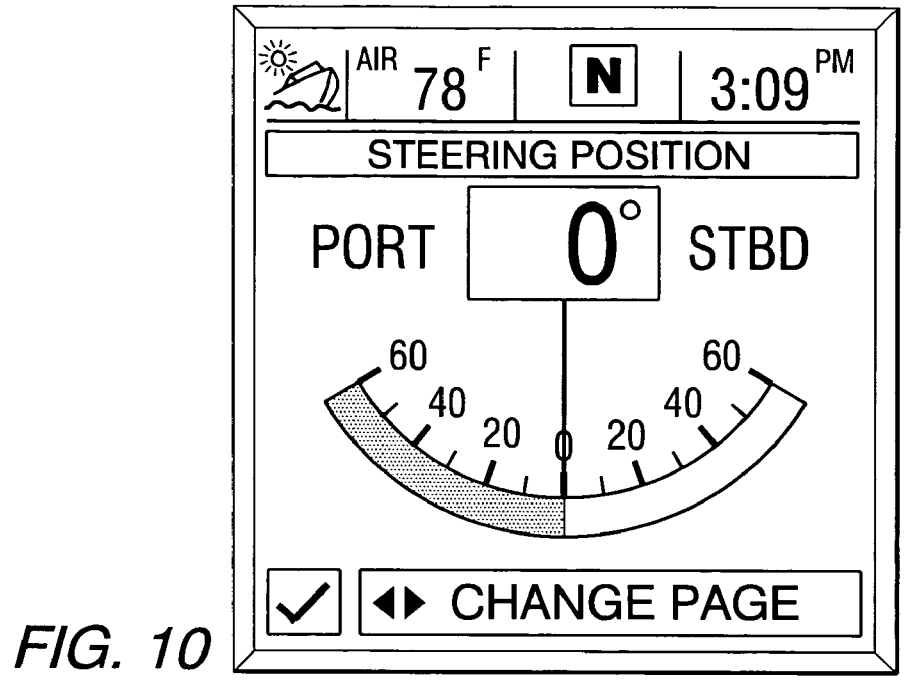

FIG. 10 shows the steering position of the marine propulsion unit of the marine vessel in a graphical angular format.

Figure 11:
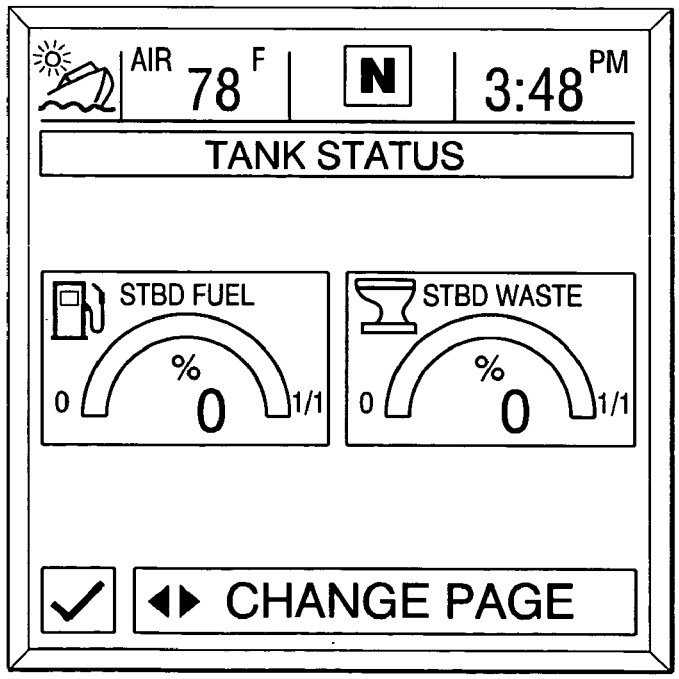
Figure 12:
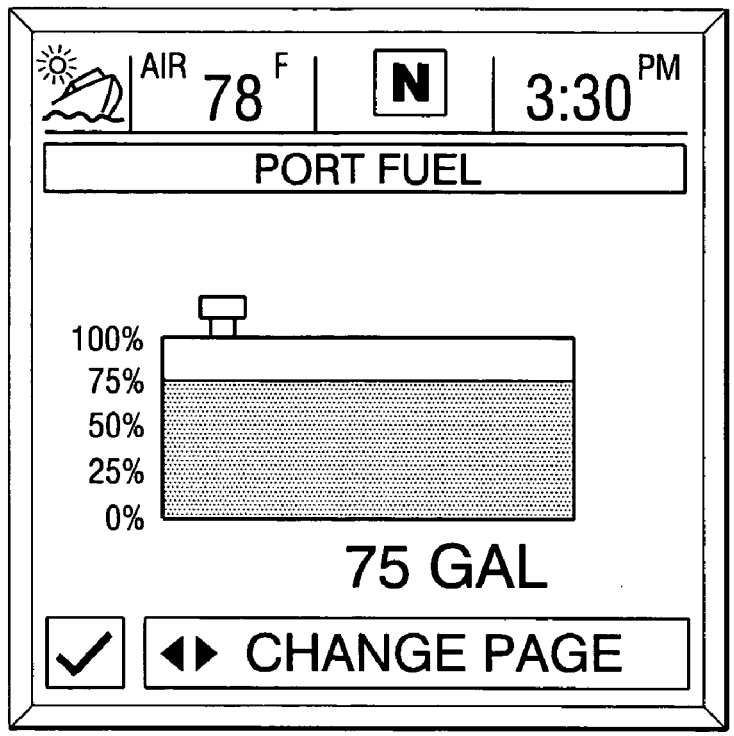
Figure 13:
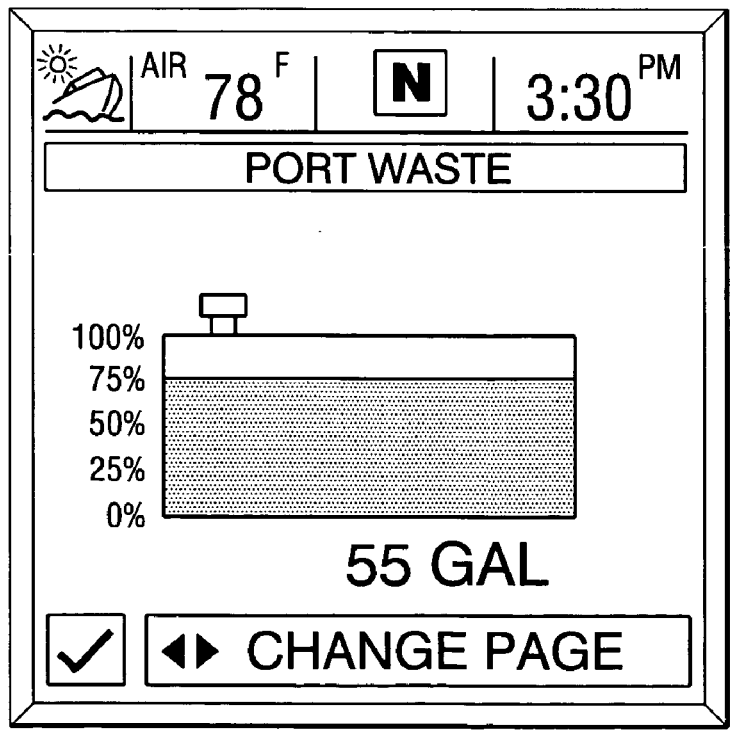

FIG. 11 shows the status of the fuel and waste tanks of the marine vessel. FIG. 12 is a graphical representation showing the percentage of fill of the fuel tank. FIG. 13 is a graphical representation showing the percentage of fill of the waste tank.

Figure 14:
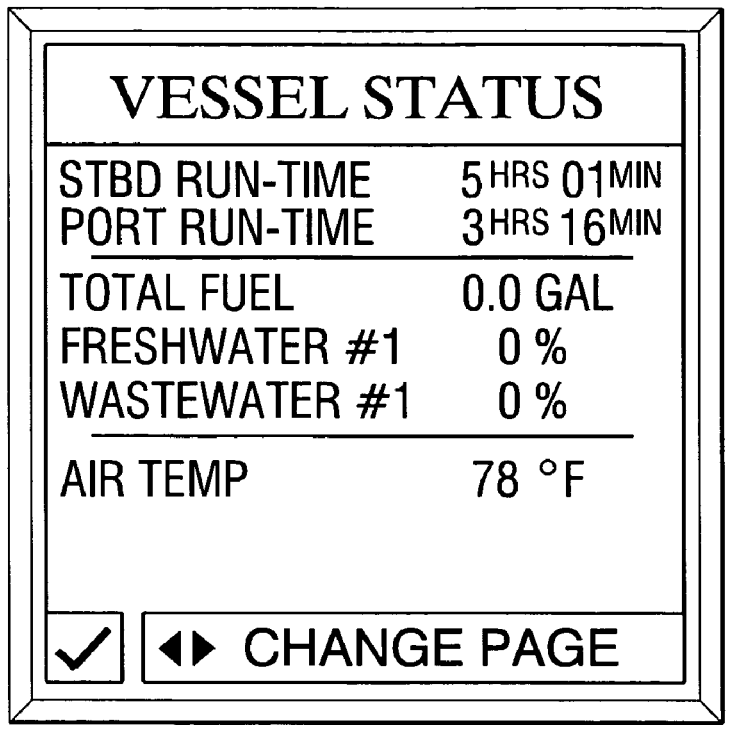
Figure 15:
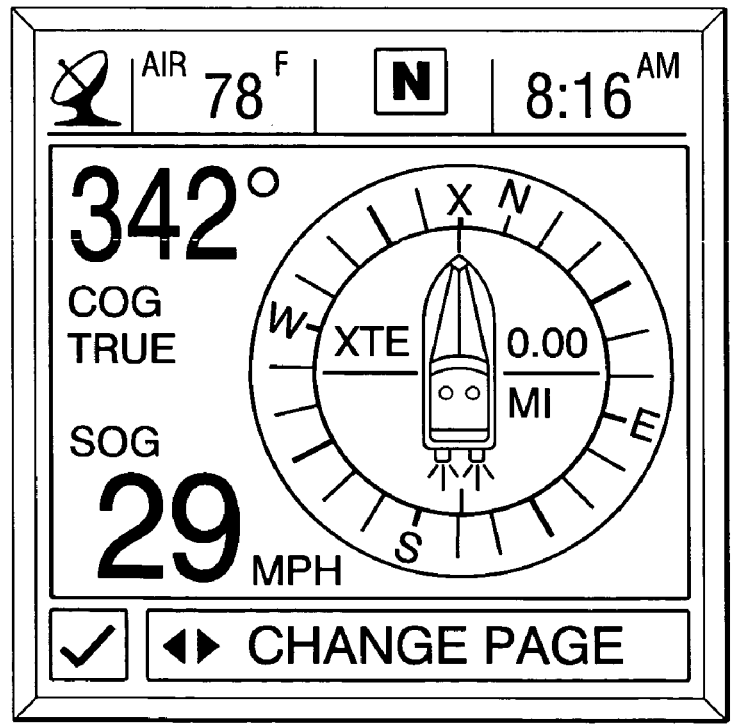

FIG. 14 is a vessel status visual image that displays engine run time, total fuel remaining, certain tank levels, and air temperature. FIG. 15 is a navigation display that shows the compass and direction of travel to a targeted way point during a journey of the marine vessel.

Figure 16:
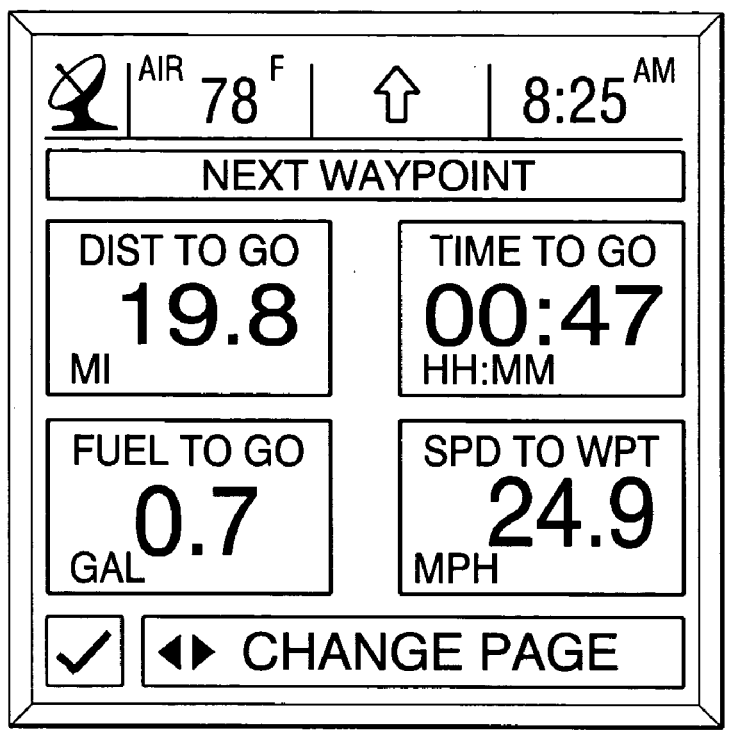
Figure 17:
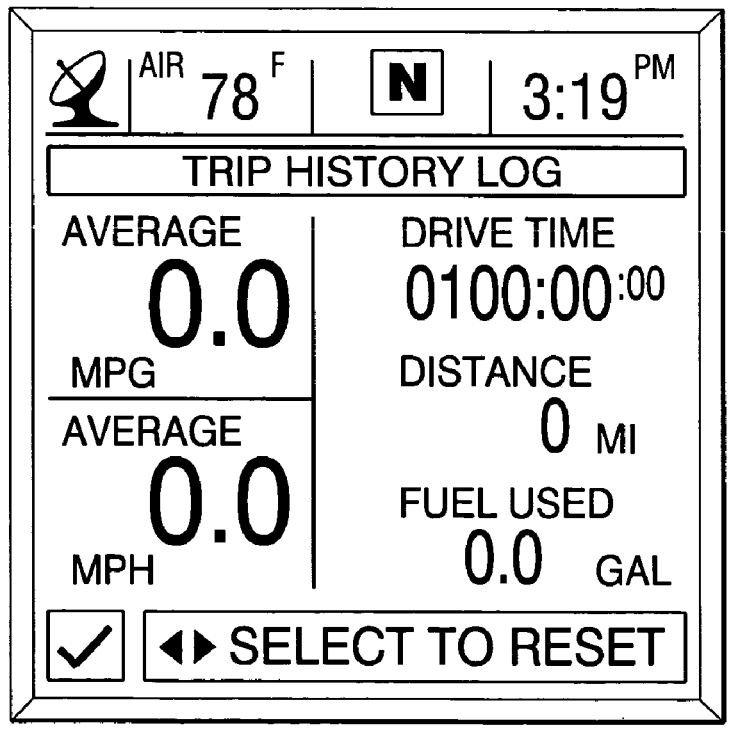

FIG. 16 is also a navigation screen in which the visual image displays navigating data as the marine vessel travels toward a way point. FIG. 17 is a trip history log which shows average miles per gallon and average miles per hour of the vessel during a trip. It also illustrates drive time, distance, and fuel used.

Figure 18:
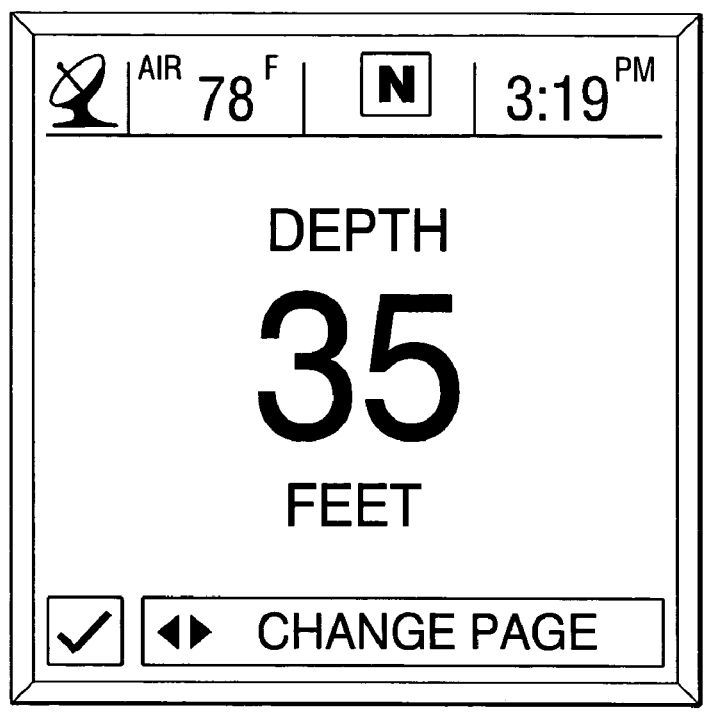
Figure 19:
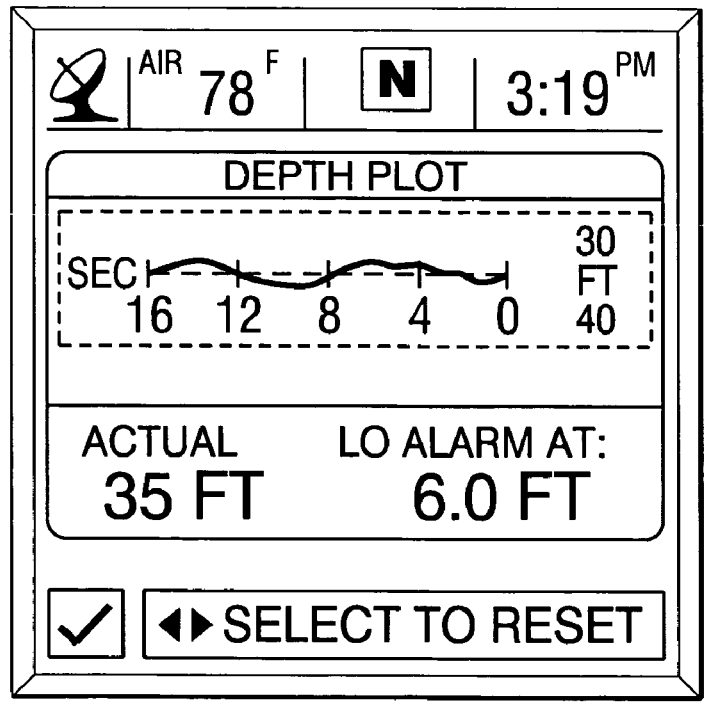
Figure 20:
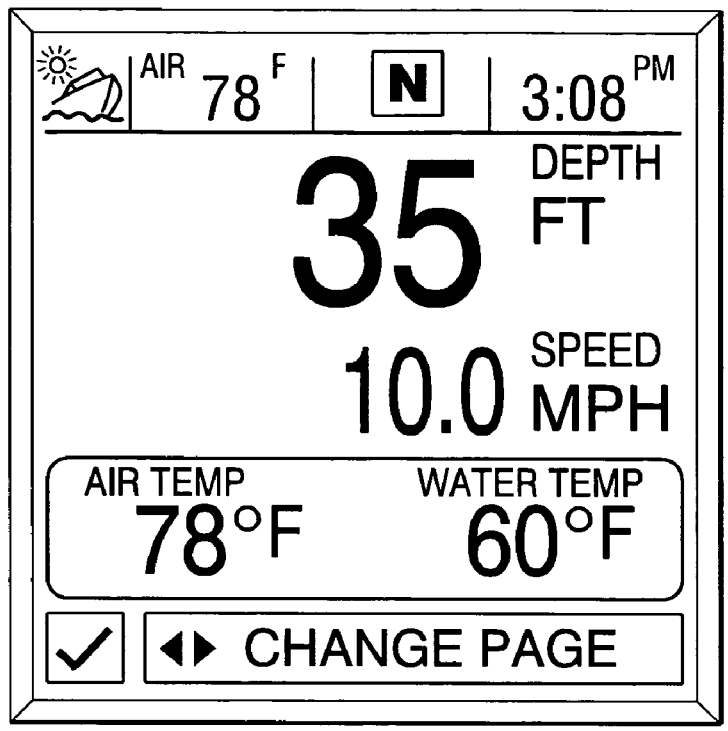
Figure 21:
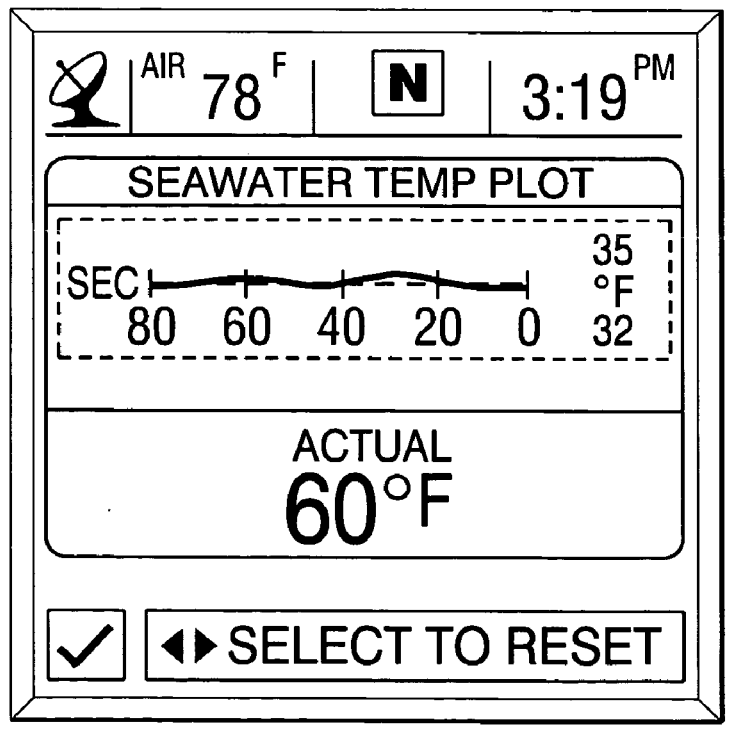
Figure 22:
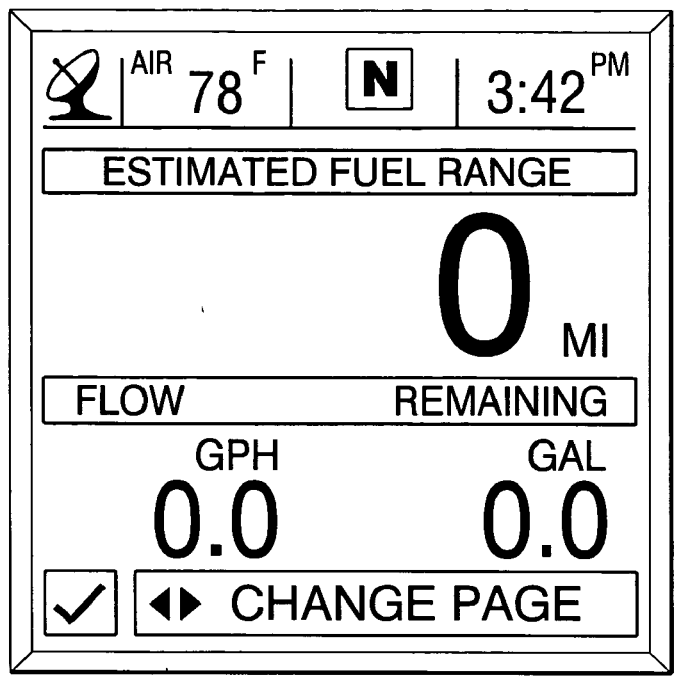

FIG. 18 is a visual image that illustrates the depth of the water below the marine vessel. FIG. 19 shows a depth plot line which is a graphical representation of depth as a function of time recorded over the most recent 16 second period. FIG. 20 shows a visual image that provides information relating to the water depth below the marine vessel, the velocity of the marine vessel, air temperature, and water temperature. FIG. 21 shows the seawater temperature proximate the marine vessel during the last 80 second period. It also shows the actual temperature. FIG. 22 shows the estimated range of the marine vessel based on current fuel tank levels. It also shows the remaining gallons in the fuel tanks and the rate at which the fuel is being used.

It should be understood that FIGS. 4–22 illustrate a plurality of visual images from which a chosen visual display can be selected. The chosen visual display can comprise one or more of the plurality of visual images shown in FIGS. 4–22. The chosen visual display is displayed on the information display device 20, which can be a monitor incorporating a liquid crystal device. Each of the plurality of visual images shown in FIGS. 4–22 comprise one or more measured magnitudes of the plurality of parameters, 41–54, described above in conjunction with FIG. 2.

The present invention determines a current operating condition of the marine vessel, such as one of the potential operating conditions, 61–68, illustrated in FIG. 2. When the current operating condition is selected by the present invention, based on the magnitudes of one or more of the plurality of parameters, 41–54, that current operating condition is used to select the chosen visual display from the plurality of visual images shown in FIGS. 4–22. The present invention then causes the chosen visual display to be displayed on the information display device 20.

When the chosen visual display comprises more than one of the plurality of visual images illustrated in FIGS. 4–22, those images are sequentially displayed on the information display device 20, with each of the individual images being shown on the display device for a preselected time period that can be manually chosen by the operator of the marine vessel. In other words, each of the individual displays can be maintained for viewing on the display device for a period of 5–30 seconds and then is followed by the next individual displays of the chosen visual display. It should be understood that this suggested range of time values is not limiting to the present invention. Other possible time selections are also within its scope.

Several examples of the operation of the present invention can be described to more clearly illustrate its basic philosophy and the method by which it implements that philosophy. As an example, when the marine vessel is in a start-up 61 operating condition, with the engine at idle speed and the gear selector in the neutral position, the vessel status page shown in FIG. 14 and the steering angle position shown in FIG. 10 could be included in the chosen visual display for that particular operating condition. As an example, the position of the rudder or drive units can be monitored and compared to an acceptable magnitude to assure that the angle is not beyond a preferred amount. This is useful prior to the operator putting the marine propulsion system into forward or reverse gear. If the controller 36 detects that the marine vessel is currently in that start-up operating condition, the visual images shown in FIGS. 10 and 14 would be automatically selected by the present invention to comprise the chosen visual display. Alternatively, if the engine is at idle speed and the gear selector is in neutral position, but the marine vessel is not in a start-up position, the idle in neutral 62 position will be identified by the controller. In that situation, the steering position visual image shown in FIG. 10, the propeller trim visual image shown in FIG. 8, the depth visual image shown in FIG. 18, and the fuel tank visual tank image of FIG. 12 can be selected by the present invention as the chosen visual display. These four visual images will be sequentially shown on the display device 20, with each of these visual images being shown by the device for a preselected time period.

When the marine vessel is in the idle in gear 63 operating condition, the steering angle (FIG. 10), water depth (FIG. 18), drive trim angle (FIG. 8), and troll control (FIG. 9) visual images can be selected as the chosen visual display. When the marine vessel is accelerating in the range between 0 and 3000 RPM, the chosen visual display can comprise the drive trim (FIG. 8), water depth (FIG. 18), and compass (FIG. 15) visual images. When the marine vessel is operating with an engine speed above a certain preselected magnitude, such as 3000 RPM, the chosen visual display can comprise the visual images relating to fuel range (FIG. 22), compass direction (FIG. 15), and next way point information (FIG. 16). When the engine is operated at wide open throttle (WOT) the chosen visual display can comprise the visual images relating to maximum engine speed (FIG. 5), range (FIG. 22), and engine running data (FIG. 14).

If the controller 36 senses that the marine vessel is approaching or has arrived at a way point, through the comparison of a global positioning sensor signal and a preset course signal, it can select a chosen visual display that comprises the visual images of the next way point (FIG. 16) and the compass direction (FIG. 15) in which the marine vessel is traveling.

It should be understood that FIGS. 4–22 show 19 possible visual images from which the chosen visual display can be selected. It is not intended that FIGS. 4–22 be exhaustive in this illustration. Other visual images can alternatively be used within the scope of the present invention.

Figure 23:
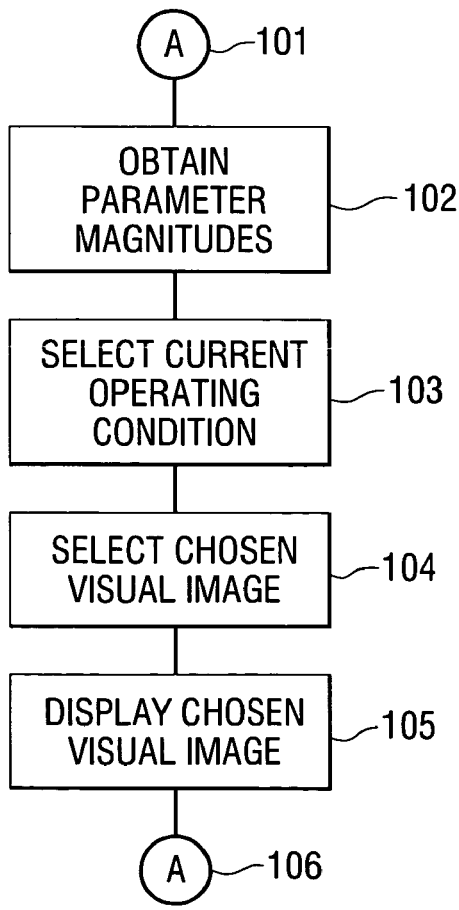
FIG. 23 is a simplified flow chart showing the sequential steps of the present invention in selecting and displaying chosen visual displays for observation by the operator of a marine vessel.

FIG. 23 is a simplified flow chart showing the steps taken in order to perform the method of the present invention. The functional blocks shown in FIG. 23 will be described in conjunction with the information illustrated in FIGS. 1–22 and described above. Beginning at the starting point 101 shown in FIG. 23, the magnitudes of the plurality of parameters, 41–54, are obtained by the controller 36 from the various sensors associated with those parameters. It should be understood that the present invention can be practiced with fewer than the 14 parameters, 41–54, illustrated in FIG. 2. The parameter magnitudes obtained, as represented in functional block 102, have been previously measured by their associated sensors. Having previously defined a plurality of potential operating conditions, 61–68, the present invention then selects a current operating condition of the marine vessel, as represented by functional block 103, based on the magnitudes of one or more of the plurality of parameters, 41–54, shown in FIG. 2.

The present invention provides an information display device 20 on which various display images can be presented. In the memory of controller 36, the present invention provides a plurality of visual images as illustrated in FIGS. 4–22. From this plurality of visual images, a chosen visual display can be selected for display on the information display device 20. As shown in FIGS. 4–22, each of the plurality of visual images comprises a measured magnitude of one or more of the plurality of parameters, 41–54, relating to the marine vessel. The present invention then selects a chosen visual image as represented by functional block 104. The chosen visual display can comprise one or more of the plurality of visual images illustrated in FIGS. 4–22. The chosen visual display is selected as a function of the magnitudes of one or more of the plurality of parameters, 41–54, shown in FIG. 2. The one or more visual images that the chosen visual displays comprises is then displayed, as represented by functional block 105, on the information display device 20. At point 106 in FIG. 23, the logic represented by the flow chart in FIG. 23 is repeated. If more than one visual image is comprised within the chosen visual display, those visual images are sequentially displayed on the information display device 20, with each individual visual image being displayed for a preselected period which is typically between 5 and 30 seconds before the next visual image replaces it on the information display device 20. The time period during which each of the individual visual images is displayed can be a time period that is manually selected by the operator of the marine vessel.

Although not shown in FIG. 23, the operator of the marine vessel can occasionally change the specific visual images that are included within each of the chosen visual displays associated with the operating conditions, 61–68. It is the operator of the marine vessel that ultimately has the power to select which images the operator prefers to see when the marine vessel is in each one of the potential operating conditions, 61–68. Once the operator makes the manual selection to define the characteristic of each chosen visual display associated with each operating condition, the system automatically displays the chosen visual display as a function of the vessel operating condition that is determined by observing the magnitudes of selected vessel parameters, 41–54.

Although the present invention has been described with significant specificity and illustrated to show particular preferred embodiments, it should be understood that alternative embodiments are also within its scope.

We claim:

1. A method for displaying marine vessel information, comprising the steps of:

measuring a magnitude of each of a plurality of parameters relating to said marine vessel;

defining a plurality of potential operating conditions of said marine vessel;

a first selecting step comprising selecting a current operating condition of said marine vessel, from said plurality of potential operating conditions of said marine vessel, as a function of one or more of said magnitudes of said plurality of parameters relating to said marine vessel;

providing an information display device;

providing a plurality of visual images from which a chosen visual display can be selected for display on said information display device, each of said plurality of visual images comprising a measured magnitude of one or more of said plurality of parameters relating to said marine vessel;

a second selecting step comprising selecting said chosen visual display image from said plurality of visual images as a function of said current operating condition;

causing said chosen visual display to be displayed on said information display device;

each of said first and second selecting steps being performed automatically without manual intervention, such that:

firstly, said current operating condition is automatically selected from said plurality of potential operating conditions as a function of one or more of said measured magnitudes of said plurality of parameters; and secondly, said chosen visual display image is automatically selected from said plurality of visual images as a function of said current operating condition chosen from said plurality of potential operating conditions.

2. The method of claim 1, wherein:
said chosen visual display comprises more than one of said plurality of visual images.

3. The method of claim 2, wherein:
said more than one of said plurality of visual images of said chosen visual display are sequentially displayed on said information display device.

4. The method of claim 3, wherein:
each of said more than one of said plurality of visual images of said chosen visual display are displayed for a time period which is manually selected.

5. The method of claim 1, further comprising:
receiving a preferred set of said plurality of visual images to be selected as said chosen visual display for each of said plurality of preselected vessel operating conditions.

6. The method of claim 5, wherein:
said preferred set of said visual images is provided as a manual input.

7. The method of claim 1, wherein:
each of said plurality of parameters relating to said marine vessel is selected from the group consisting of engine speed, velocity of said marine vessel, engine temperature, water pressure, battery charge, fuel flow rate, oil pressure, propeller trim angle, steering position, quantity of remaining fuel in a fuel tank, quantity of waste in a waste tank, direction of travel of said marine vessel, relative global position of said marine vessel and a preselected position, water depth, water temperature, and trim tab position.

8. The method of claim 1, wherein:
each of said potential operating conditions of said marine vessel is selected from the group consisting of idle engine speed and neutral gear selection, idle engine speed in forward or reverse gear, a gear selection other than neutral and a rate of change of engine speed greater than a preselected magnitude in a positive direction between idle and a preselected engine speed, engine speed greater than said preselected engine speed, a marine vessel velocity within a preselected range of magnitudes, and an engine speed within a predetermined range of maximum engine speed.

9. The method of claim 1, further comprising:
receiving a manually controlled input command which defines which of said plurality of visual images said chosen visual display comprises for each of said plurality of potential operating conditions of said marine vessel.

10. The method of claim 1, wherein:
said information display device is a liquid crystal display device.

11. A method for displaying marine vessel information, comprising the steps of:
measuring a magnitude of each of a plurality of parameters relating to said marine vessel;
defining a plurality of potential operating conditions of said marine vessel;
a first selecting step comprising selecting a current operating condition of said marine vessel, from said plurality of potential operating conditions of said marine vessel, as a function of one or more of said magnitudes of said plurality of parameters relating to said marine vessel;
providing an information display device;
providing a plurality of visual images from which a chosen visual display can be selected for display on said information display device, each of said plurality of visual images comprising a measured magnitude of one or more of said plurality of parameters relating to said marine vessel;
a second selection step comprising selecting said chosen visual display image from said plurality of visual images as a function of said current operating condition, said chosen visual display comprising more than one of said plurality of visual images;
causing said chosen visual display to be displayed on said information display device;
each of said first and second selecting steps being performed automatically without manual intervention, such that:
firstly, said current operating condition is automatically selected from said plurality of potential operating conditions as a function of one or more or said measured magnitudes of said plurality of said parameters;
and secondly, said chosen visual display including said more than one of said plurality of visual images is automatically selected from said plurality of visual images as a function of said current operating condition chosen from said plurality of potential operating conditions.

12. The method of claim 11, wherein:
said more than one of said plurality of visual images of said chosen visual display are sequentially displayed on said information display device.

13. The method of claim 12, wherein:
each of said more than one of said plurality of visual images of said chosen visual display are displayed for a time period which is manually selected.

14. The method of claim 13, further comprising:
receiving a preferred set of said plurality of visual images to be selected as said chosen visual display for each of said plurality of preselected vessel operating conditions.

15. The method of claim 11, wherein:
said plurality of visual images includes a preferred set of said visual images provided as a manual input.

16. The method of claim 11, wherein:
each of said plurality of parameters relating to said marine vessel is selected from the group consisting of engine speed, velocity of said marine vessel, engine temperature, water pressure, battery charge, fuel flow rate, oil pressure, propeller trim angle, steering position, quantity of remaining fuel in a fuel tank, quantity of waste in a waste tank, direction of travel of said marine vessel, relative global position of said marine vessel and a preselected position, water depth, water temperature, and trim tab position; and
each of said potential operating conditions of said marine vessel is selected from the group consisting of idle engine speed and neutral gear selection, idle engine speed in forward or reverse gear, a gear selection other than neutral and a rate of change of engine speed greater than a preselected magnitude in a positive direction between idle and a preselected engine speed, engine speed greater than said preselected engine speed, a marine vessel velocity within a preselected range of magnitudes, and an engine speed within a predetermined range of maximum engine speed.

17. The method of claim 11, further comprising:
receiving a manually controlled input command which defines which of said plurality of visual images said chosen visual display comprises for at least one of said plurality of potential operating conditions of said marine vessel.

18. A method for displaying marine vessel information, comprising the steps of:
measuring a magnitude of each of a plurality of parameters relating to said marine vessel;
defining a plurality of potential operating conditions of said marine vessel;
a first selecting step comprising selecting a current operating condition of said marine vessel, from said plurality of potential operating conditions of said marine vessel, as a function of one or more of said magnitudes of said plurality of parameters relating to said marine vessel;
providing an information display device;
providing a plurality of visual images from which a chosen visual display can be selected for display on said information display device, each of said plurality of visual images comprising a measured magnitude of one or more of said plurality of parameters relating to said marine vessel;
receiving a manually controlled input command which defines which of said plurality of visual images said chosen visual display comprises for at least one of said plurality of potential operating conditions of said marine vessel;
a second selecting step comprising selecting said chosen visual display image from said plurality of visual images as a function of said current operating condition;
causing said chosen visual display to be displayed on said information display device;
each of said first and second selecting steps being performed automatically without manual intervention, such that:
firstly, said current operating condition is automatically selected from said plurality of potential operating conditions as a function of one or more of said measured magnitudes of said plurality of parameters;
and secondly, said chosen visual display image is automatically selected from said plurality of visual images as a function of said current operating condition chosen from said plurality of potential operating conditions and as a function of said manual receiving step.

19. The method of claim 18, wherein:
said more than one of said plurality of visual images of said chosen visual display are sequentially displayed on said information display device, each of said more than one of said plurality of visual images of said chosen visual display being displayed for a time period which is manually selected.

20. The method of claim 19, wherein:
each of said plurality of parameters relating to said marine vessel is selected from the group consisting of engine speed, velocity of said marine vessel, engine temperature, water pressure, battery charge, fuel flow rate, oil pressure, propeller trim angle, steering position, quantity of remaining fuel in a fuel tank, quantity of waste in a waste tank, direction of travel of said marine vessel, relative global position of said marine vessel and a preselected position, water depth, water temperature, and trim tab position; and
each of said potential operating conditions of said marine vessel is selected from the group consisting of idle engine speed and neutral gear selection, idle engine speed in forward or reverse gear, a gear selection other than neutral and a rate of change of engine speed greater than a preselected magnitude in a positive direction between idle and a preselected engine speed, engine speed greater than said preselected engine speed, a marine vessel velocity within a preselected range of magnitudes, and an engine speed within a predetermined range of maximum engine speed.

* * * * *